United States Patent [19]

von Gentzkow et al.

[11] 4,418,170

[45] Nov. 29, 1983

[54] METHOD FOR STABILIZING ORGANIC POLYMERS AGAINST OXIDATIVE DECOMPOSITION

[75] Inventors: Wolfgang von Gentzkow, Kleinsendelbach; Manfred Schmiedel, Nürnberg-Grossgründlach, both of Fed. Rep. of Germany

[73] Assignee: Siemens Aktiengesellschaft, Munich, Fed. Rep. of Germany

[21] Appl. No.: 399,206

[22] Filed: Jul. 19, 1982

[30] Foreign Application Priority Data

Aug. 6, 1981 [DE] Fed. Rep. of Germany ....... 3131221

[51] Int. Cl.$^3$ ................................................ C08K 5/25
[52] U.S. Cl. ............................ 524/193; 174/110 PM; 174/110 SR; 523/210; 523/333; 524/145; 524/167; 524/168; 524/261; 524/315; 524/317; 524/318; 524/465
[58] Field of Search ............... 524/193, 145, 167, 168, 524/261, 315, 317, 318, 465; 174/110 PM, 110 SR; 523/210, 333

[56] References Cited

U.S. PATENT DOCUMENTS

| | | | |
|---|---|---|---|
| 3,733,427 | 5/1973 | Clark et al. | 174/110 PM |
| 3,849,492 | 11/1974 | Brunetti et al. | 524/194 |
| 3,904,541 | 9/1975 | Charlton | 174/110 PM |
| 4,044,200 | 8/1977 | Turbett | 174/110 PM |

FOREIGN PATENT DOCUMENTS

| | | |
|---|---|---|
| 3033383 | 4/1982 | Fed. Rep. of Germany . |
| 8015131 | 2/1980 | South Africa . |
| 1593902 | 7/1981 | United Kingdom . |

Primary Examiner—Veronica P. Hoke
Attorney, Agent, or Firm—Kenyon & Kenyon

[57] ABSTRACT

A method for stabilizing organic polymers against copper-catalyzed oxidative decomposition by means of N,N-bis-salicyloyl hydrazine as a metal deactivator is described wherein dust development of the metal deactivator is precluded with certainty and negative property changes of the stabilized organic polymers are avoided. For this purpose, it is provided that a paste which contains finely-crystalline N,N'-bis-salicyloyl hydrazine in fine distribution in a liquid to wax-like aliphatic hydrocarbon of low volatility is worked into the polymer. The method is particularly well suited for stabilizing polyolefins for cable and wire insulation.

7 Claims, No Drawings

METHOD FOR STABILIZING ORGANIC POLYMERS AGAINST OXIDATIVE DECOMPOSITION

BACKGROUND OF THE INVENTION

The present invention relates to a method for stabilizing organic polymers against copper-catalyzed oxidative decomposition through use of N,N'-bis-salicyloyl hydrazine as a metal deactivator.

Many organic materials, particularly polymers such as polyolefins, polyoxymethylenes, polyamides and unsaturated polyester resins which are being used today in electrical engineering for insulating purposes, are subjected to accelerated thermo-oxidative aging in the presence of copper. This aging causes the electrical and mechanical use properties of such polymers to deteriorate considerably. Particularly aggravating is the harmful effect of copper at elevated temperatures, since the aging rate of the polymers increases steeply with increasing temperatures.

Cross-linked polyolefins, which currently are being employed more and more as insulating material for cables or wires, are particularly subject to heavily accelerated aging in the presence of copper and must therefore be protected effectively against the oxidation-accelerating influence of the copper. According to experience, this protection can be accomplished by placing a foil between the copper conductor and the insulation as a separting, layer, or by using tinned conductors, thereby preventing direct contact of the copper and the insulation. Such measures are expensive, however, and require considerable effort in production. This, if a foil is used as a separating layer, only low production rates are possible, particularly for small conductor cross sections.

Another approach to achieving the desired requirements with respect to quality and temperature resistance of polymer materials in contact with copper is the use of so-called "copper deactivators" which inhibit the oxidation-accelerating effect of copper even at elevated temperatures. The stabilization of polymer materials by copper deactivators is much simpler, from a production point of view, than the use of foil separating layers and is, therefore, a cost-effective measure.

It is known from U.S. Pat. No. 3,849,492 to use copper deactivators of the N,N'-bis-salicyloyl-hydrazine type. Multiply alkyl- or alkoxy-substituted derivatives of the base compound are taught by this patent to have particularly proven themselves for the stabilization of polyolefins against the harmful effect of copper and other transition metals.

It is known from British Patent Specification No. 1,593,902 that for the permanent stabilization of polymers which are in contact with copper, a combination of N,N'-bis-salicyloyl hydrazine as a metal deactivator and oligomeric 2,2,4-trimethyl-1,2-dihydroquinoline as an oxidation inhibitor is commercially advantageous. This stabilizer combination has been found to be particularly effective for cross-linked polyolefins. The high effectiveness of N,N'-bis-salicyloyl hydrazine as a metal deactivator was determined on the basis of extensive tests on model conductors and through aging tests on commercial products.

A metal deactivator of the type mentioned (as well as other additives) can be worked into a polymer material, such as into a polyolefin for cable or wire insulation, on a commercial scale by customary mixing processes. In cable and wire technology, so-called "concentrates" consisting of a metal deactivator or other additives and polymer material are preferably prepared first, and these concentrates are then processed further by admixture into further polymer material to form insulation mixtures with the desired concentrations of metal deactivator and the other additives. In the preparation of the concentrates with the metal deactivator N,N'-bis-salicyloyl hydrazine on a commercial production scale, it has been found that eye irritation or eye damage occurs in persons concerned therewith.

To determine the cause of the eye irritation or eye damage, tests with rabbits were performed. Since it must be assumed that the metal deactivator can, during the processing, get into the eye in solid form, for example, as dust, the solid substance repeatedly with placed at relatively short time intervals, i.e., daily, in the eye of the test animals, and the changes in the eye were observed over an extended period of time. As a result of these tests it was determined that the eye irritations and eye damage were caused by the N,N'-bis-salicyloyl hydrazine or by a small amount of impurities contained therein due to its manner of preparation.

According to South-African Patent 80/5131 and German Offenlegungsschrift 30 33 383, greatly reduced eye irritations or eye damage occur if an N,N'-bis-salicyloyl hydrazine is used which is obtained by reaction of alkyl salicylate with either hydrazine or salicylic acid hydrazide. However, the products obtained in this manner are not completely safe physilogically.

SUMMARY OF THE INVENTION

It is an object of the present invention to describe a simple method for stabilizing organic polymers by means of N,N'-bis-salicyloyl hydrazine as a metal deactivator, which method is cost-effective, of general applicability, involves safe handling, results in the near certain elimination of dust formation of the metal deactivator and avoids adverse effects or property changes in the stabilized organic polymers.

According to the present invention, this and other objects are achieved by the provision of a process wherein a paste which contains finely-crystalline N,N'-bis-salicyloyl hydrazine in fine distribution in a liquid to wax-like aliphatic hydrocarbon of low volatility is worked into the polymer.

Surprisingly, it has been found that with the method according to the present invention, the method deactivator can be worked into the polymers (such as polyolefins) much more simply, and can be distributed therein more homogeneously than is the case with material in powder form. In addition, the cross-linking of polyolefins and the commercially required properties of polyolefins and cross-linked polyolefins are not affected adversely by the paste or the hydrocarbons. It is a further important feature of the method according to the present invention that on the surface of the polymers lower concentrations of metal deactivators are obtained if the paste is used. This in turn has the advantage of less abrasion of N,N'-bis-salicyloyl hydrazine in dust form, which could cause eye irritation.

The paste used in the method according to the present invention is practically a disperse system (dispersion), since the N,N'-bis-salicyloyl hydrazine is finely distributed in a dispersion medium, the hydrocarbon. "Fine distribution" is understood here to be the fact that the metal deactivator is present in the paste without agglomeration.

The paste contains the N,N'-bis-salicyloyl hydrazine (which is also called BSH in the following for short) in finely-crystalline form. The most advantageous procedure for preparing the paste is to mix the coarse-crystalline material obtained in the preparation of the metal deactivator with the dispersion medium and then subsequently milling the mixture, for example, in a ball mill or a corundum disc mill. Particularly finely dispersed pastes are obtained if the milling process takes place at elevated temperatures (up to about 100° C.). However, the paste also can be prepared by intensively mixing finely-crystalline BSH with the dispersion medium, for example, by means of a stirrer. Again, elevated temperatures may be employed, the temperature depending generally on the viscosity of the dispersion medium. Finely crystalline BSH preferably is obtained by reprecipitation of the material obtained in the synthesis, for example, by dissolution in sodium hydroxide and precipitation with hydrochloric acid.

The paste used in the method according to the present invention is preferably prepared immediately after the synthesis of the N,N'-bis-salicyloyl hydrazine. It is advisable to dry the freshly synthesized BSH in the vessel, i.e., for example, in the stirring vessel, in which the paste subsequently is prepared. However, the procedure can also be that the product, which is still moist from a previous treatment due to adhering liquid such as alcohol, is processed immediately into a paste and that only then a kind of drying and purification process follows, wherein the alcohol and residues of volatile starting substances and secondary products of the synthesis are removed by stirring the paste in a vacuum at temperatures up to 100° C. or by means of a degassing cascade. With such a procedure it is ensured that, from the time of synthesis of the metal deactivator, to the subsequent preparation and storage of the paste (as well as possibly the shipment thereof), to the working-in of the paste into the materials to be stabilized, any danger to persons due to N,N'-bis-salicyloyl hydrazine in dust form is precluded with certainty.

As the polymer materials are in liquid or plastic form at the processing temperature, the paste may advantageously be worked into the polymer by metering the paste from the storage or shipping containers (such as barrels) with pumping and metering devices directly into the devices serving for the preparation of the mixture, for example, into the kneaders or mixing devices commonly used for cable and wire insulation mixtures of the polyolefin type, or directly into the extruder. It is found that the paste can be transported and metered more simply and distributed in the polymers better with decreasing crystal size of the metal deactivator and increasing degree of dispersion. The fact that the BSH paste is easily worked into the polymer assures sufficient mixing homogeneity. In addition, the advantage of direct metering in the processing and forming of polymer materials results from the rapid and homogeneous distributability of the finely dispersed paste and, thus, prevention of dust development and skin contact of the persons concerned with the processing can be insured.

In the method according to the present invention, a paste preferably is employed which contains N,N'-bis-salicyloyl hydrazine and the aliphatic hydrocarbon, i.e., the dispersion medium, in the ratio of about 1:2 to 2:1. Preferably, the ratio of BSH and the dispersion medium is about 1:1.

As already mentioned, the dispersion medium is a liquid to wax-like aliphatic hydrocarbon of low volatility. Hydrocarbon mixtures also can be used. "Aliphatic hydrocarbon" is understood in this context to be a hydrocarbon which has a predominantly aliphatic character. The hydrocarbon may, therefore, also contain aromatic radicals or aromatic components may be contained in hydrocarbon mixtures. The term "low volatility" is intended to express the fact that the hydrocarbon is not yet noticeably volatile even at elevated temperatures, i.e., in particular at temperatures of about 250° to 300° C.

Low-molecular polyolefins, preferably (low-molecular) polyisobutenes or (liquid to vaseline-like) paraffins and paraffin mixtures may be used as dispersion media. In addition, a number of other compounds can be employed such as extender oils, petrolates, cable filler compounds, mineral oils, synthetic oils and waxes. To particular advantage, viscous (viscosity > 5000 cP at 20° C.) dispersion media may be used, because extremely stable pastes can be obtained thereby.

By using N,N'-bis-salicyloyl hydrazine in paste form, the dust formation is prevented in the method according to the present invention and, thus, penetration of BSH in dust form into the eye is made impossible. The number of theoretically possible dispersion media for preparing this paste per se is very large. Thus, besides the compounds mentioned above, the following classes of substances also can be considered: Phosphoric-acid esters, fatty-acid esters, glycolic-acid esters, polyesters, halogenated hydrocarbons, sulfonic-acid esters, sulfamides, alcohols, ethers, ketones, polycondensates and silicone oils. Selection of a suitable dispersion medium, however, must take into account the many requirements to be met by such a liquid. In particular, the dispersion medium must not limit the possible applications of the metal deactivator N,N'-bis-salicyloyl hydrazine for organic polymers such as cross-linked and non-cross-linked polyolefins. Further, the properties required for technical uses (for example, of polyolefins as cable and wire insulation or for hot-water pipes) must not be impaired. In addition, the ability to work-in the metal deactivator and its homogeneous distribution in the materials to be stabilized must not be impaired and the cost of manufacturing commercial products from these materials must not be increased. If a paste-like metal deactivator is used for stabilizing cable and wire insulation, it also must be taken into consideration that the danger exists that the dispersion medium makes working-in of the metal deactivator more difficult due to a lubricating effect or exudes from the finished insulating layers and caused difficulties at contacts and joints. Finally, it must also be assured that the radical-wise cross-linking of polyolefins, which is performed particularly in cable and wire insulation for low voltage applications, is not impaired by the dispersion medium. These requirements are not met to a sufficient degree by the above-mentioned classes of substances.

By means of the method according to the present invention, in which the metal deactivator is worked into the polymer material in the form of a paste, cross-linked and non-cross-linked thermoplastics such as cross-linked and non-cross-linked polyolefins and elastomers as well as reaction resins in hardened and unhardened condition can advantageously be protected against harmful catalytic effects of copper or copper ions with which the polymers are in contact. Polymers with the metal deactivator work-in according to the present invention can be used particularly advantageously as cable and wire insulation in power and communications engineering or for pipes, pipe joints or linings for pipes, especially in connection with copper pipes. In addition, the method according to the present invention also can be used for stabilizing polymer materials, insulating oils and lubricating greases which are in contact with copper or contain copper ions. Such insulating oils and lubricating greases are used particularly in electrical engineering.

If N,N'-bis-salicyloyl hydrazine is used in polymers in combination with oxidation inhibitors or others additives, the oxidation inhibitors and other additives can either be processed by the customary method via the preparation of polymer concentrates, or they can be processed together with the N,N'-salicyloyl hydrazine to form a paste and be admixed to the polymers in this form.

DETAILED DESCRIPTION OF THE INVENTION

The invention is explained in greater detail by means of the following illustrative examples which show the commercial suitability of the method according to the present invention for peroxide- and radiation-cross-linked polyolefins.

EXAMPLE 1

(a) Preparation of Mixture

The amount of high-density polyethylene PE (d=0.918 g/cm$^3$, MFI$_{190/2}$=0.2) given in Table 1 is plasticized in a kneader at a temperature of 140° C. After adding the additives listed in Table 1 (BSH or BSH paste and, optionally, stabilizer), homogenization is carried out for 5 minutes at a temperature of 140° to 150° C. in nitrogen. The BSH paste used is a mixture of equal parts BSH and liquid paraffin (viscosity at 20° C.: 100 cP).

(b) Preparation of Samples

The mixture obtained in the manner described above is granulated and pressed into sheets 1 mm thick at a press temperature of 180° C. (pressing time, 1 minute). The sheets are cross-linked at room temperature with electron rays of a dose of 200 and 250 kGy, respectively. (radiation source: 750-kV cascade electron accelerator, 4 kW).

(c) Evaluation of Cross-Linking

The cross-linking of the irradiated sheets is determined by ascertaining the insoluble portion after a 12-hour granulate extraction (granulate of cubes with a side length of 1 mm) in boiling xylene (percent cross-linking) and by measuring the thermal expansion as per VDE 0472 d/. . . 75, Draft 1,§615. Here, the transient elongation (in %) measured at 200° C. after loading a standard specimen with 20 N/cm$^2$ for 15 minutes, is given together with the permanent elongation (in %) measured 5 minutes after relieving the load and at the same temperature (in the form of two figures separated by a slash). Table 1 contains the cross-linking values determined for the samples of mixtures 1 to 4.

EXAMPLE 2

The amount of high-density polyethylene PE (d=0.918 g/cm$^3$, MFI$_{190/2}$=0.2) given in Table 2 is plasticized in a kneader at a temperature of 140° C. After adding according to Example 1 the amounts of BSH or BSH paste as well as, optionally, stabilizer listed in Table 2, homogenization is carried out for 5 minutes at a temperature of 140° C. in nitrogen and, after adding a peroxide, i.e., 1,3-bis (tert.butylperoxiisopropyl)-benzene, for another 2 minutes in nitrogen.

The preparation of the samples and the evaluation of the cross-linking takes place as in Example 1. Table 2 contains the cross-linking values determined for the samples of the mixtures 5 to 8.

EXAMPLE 3

The amount given in Table 3 of an ethylene vinylacetate copolymerisate EVA with an 8.7-% VA content (d=0.929 g/cm$^3$, MFI$_{190/2}$=0.1 to 0.3) is mixed, as in Example 2, with BSH or BSH paste according to Example 1 and, optionally, with stabilizer as well as peroxide. The samples are then pressed into sheets and the cross-linking is checked. Table 3 contains the cross-linking value determined for the samples of mixtures of 9 to 12.

EXAMPLE 4

The amount of high-density polyethylene PE (d=0.918 g/cm$^3$, MFI$_{190/2}$=0.2) given in Table 4 is plasticized in a kneader at a temperature of 140° C. After adding the additives listed in Table 4 (BSH or BSH paste as well as, optionally, stabilizer), homogenization is carried out for 5 minutes at a temperature of 140° to 150° C. in nitrogen. The BSH paste used is a mixture of equal parts BSH and polyisobutene (viscosity at 20° C., 22,000 cP).

The preparation of the samples and the evaluation of the cross-linking are similar to Example 1. Table 4 contains the cross-linking values determined for the samples of mixtures 13 to 16.

The examples show clearly that the dispersion medium does not affect the cross-linking of polyolefins adversely.

TABLE I

| | | Cross linking after Irradiation with: | | | |
|---|---|---|---|---|---|
| | | 200 kGy | | 250 kGy | |
| No. | Mixture | Gel Value [%] | Thermal Expansion [%] | Gel Value [%] | Thermal Expansion [%] |
| 1 | 99.7% PE + 0.3% BSH | 76 | 116/8 | 79 | 72/4 |
| 2 | 99.4% PE + 0.6% BSH-Paste | 76 | 120/8 | 79 | 76/4 |
| 3 | 99.4% PE + 0.3% BSH + 0.3% Stabilizer* | 71 | 148/12 | 75 | 96/8 |
| 4 | 99.1% PE + 0.6% BSH-Paste + 0.3% Stabilizer* | 71 | 150/12 | 76 | 104/8 |

*polymeric 2,2,4-Trimethyl-1,2-dihydroquinoline

TABLE 2

| | | Cross-linking | |
|---|---|---|---|
| No. | Mixture | Gel Value [%] | Thermal Expansion [%] |
| 5 | 98.5% PE + 0.3% BSH + 1.2% Peroxide** | 88 | 40/4 |
| 6 | 98.2% PE + 0.6% BSH-Paste + 1.2% Peroxide** | 87 | 40/4 |
| 7 | 98.2% PE + 0.3% BSH + 0.3% Stabilizer* + 1.2% Peroxide** | 84 | 48/8 |
| 8 | 97.9% PE + 0.6% BSH-Paste + 0.3% Stabilizer* | 84 | 48/8 |

TABLE 2-continued

| No. | Mixture | Cross-linking Gel Value [%] | Thermal Expansion [%] |
|---|---|---|---|
|  | + 1.2% Peroxide** |  |  |

*polymeric 2,2,4-Trimethyl-1,2-dihydroquinoline
**1,3-Bis(tert.butylperoxiisopropyl)-benzene

TABLE 3

| No. | Mixture | Cross-linking Gel Value [%] | Thermal Expansion [%] |
|---|---|---|---|
| 9 | 98.5% EVA + 0.3% BSH + 1.2% Peroxide** | 94 | 20/4 |
| 10 | 98.2% EVA + 0.6% BSH-Paste + 1.2% Peroxide** | 93 | 24/4 |
| 11 | 98.2% EVA + 0.3% BSH + 0.3% Stabilizer* + 1.2% Peroxide** | 91 | 28/8 |
| 12 | 97.9% EVA + 0.6% BSH-Paste + 0.3% Stabilizer* + 1.2% Peroxide** | 91 | 28/8 |

*polymeric 2,2,4-Trimethyl-1,2-dihydroquinoline
**1,3-Bis(tert.butylperoxiisopropyl)-benzene

TABLE 4

| No. | Mixture | Cross-linking after Irradiation with: 200 kGy | | 250 kGy | |
|---|---|---|---|---|---|
|  |  | Gel Value [%] | Thermal Expansion [%] | Gel Value [%] | Thermal Expansion [%] |
| 13 | 99.7% PE + 0.3% BSH | 75 | 116/8 | 79 | 76/4 |
| 14 | 99.4% PE + 0.6% BSH-Paste | 76 | 120/8 | 78 | 80/4 |
| 15 | 99.4% PE + 0.3% BSH + 0.3% Stabilizer* | 71 | 148/12 | 75 | 100/8 |
| 16 | 99.1% PE + 0.6% BSH-Paste + 0.3% Stabilizer* | 72 | 150/12 | 76 | 104/8 |

*polymeric 2,2,4-Trimethyl-1,2-dihydroquinoline

What is claimed is:

1. A method for stabilizing organic polymers against copper-catalyzed oxidative decomposition, comprising forming a paste containing finely-crystalline N,N'-bis-salicyloyl hydrazine finely-distributed in a liquid to wax-like aliphatic hydrocarbon of low volatility, and admixing said paste with said organic polymers.

2. The method according to claim 1 wherein the ratio of N,N'-bis-salicyloyl hydrazine to said hydrocarbon in said paste is in the range of from about 1:2 to 2:1.

3. The method according to claim 1 wherein said hydrocarbon is a low molecular polyolefin.

4. The method according to claim 3 wherein said hydrocarbon is polyisobutene.

5. The method according to claim 1 wherein said hydrocarbon is paraffin.

6. The method according to claim 1 wherein said hydrocarbon is a viscous hydrocarbon.

7. The method according to claim 1 wherein said paste further contains an oxidation inhibitor.

* * * * *